United States Patent [19]

Saclier

[11] Patent Number: 5,011,738

[45] Date of Patent: Apr. 30, 1991

[54] PROCEDURE FOR THE APPLICATION OF A PTFE-BASED SELF-LUBRICATING COATING ON A BEARING ELEMENT, AND THE BEARINGS THUS OBTAINED

[75] Inventor: Claude Saclier, Seynod-Annecy, France

[73] Assignee: S.N.R. Roulements, Annecy Cedex, France

[21] Appl. No.: 374,780

[22] Filed: Jul. 3, 1989

[30] Foreign Application Priority Data

Jul. 1, 1988 [FR] France ................................. 88 08913

[51] Int. Cl.$^5$ ........................... B32B 27/00; B05D 3/00
[52] U.S. Cl. .................................... 428/422; 427/327; 148/253; 148/254; 148/256; 148/257
[58] Field of Search ................ 427/327; 148/253, 254, 148/256, 257; 428/422

[56] References Cited

U.S. PATENT DOCUMENTS

| | | | |
|---|---|---|---|
| 4,290,337 | 9/1981 | Kunata et al. | 411/368 |
| 4,564,397 | 1/1986 | Opsahl | 148/257 |
| 4,586,963 | 5/1986 | Smith et al. | 148/257 |
| 4,717,431 | 1/1988 | Knaster | 427/327 |
| 4,748,055 | 5/1988 | Landers et al. | 148/257 |
| 4,880,476 | 11/1989 | Matsuda et al. | 148/253 |
| 4,883,722 | 11/1989 | Coppens et al. | 427/328 |

*Primary Examiner*—Stanley Silverman
*Attorney, Agent, or Firm*—Oblon, Spivak, McClelland, Maier & Neustadt

[57] ABSTRACT

A procedure for the application of PTFE-based, self-lubricating coating on a steel bearing element whose chrome and nickel contents are less than 5%, is disclosed. The procedure is characterized by a working process whereby the element undergoes a preparatory treatment during which crystal nuclei form, followed by phosphatization treatment which forms a microcrystalline layer composed of an iron and manganese compound, then by the application of PTFE on the surface and between the crystals.

8 Claims, 1 Drawing Sheet

PROCEDURE FOR THE APPLICATION OF A PTFE-BASED SELF-LUBRICATING COATING ON A BEARING ELEMENT, AND THE BEARINGS THUS OBTAINED

BACKGROUND OF THE INVENTION

1. Field of the Invention

The present invention concerns a procedure for the application of a PTFE (polytetrafluoroethylene)-based, self-lubricating coating on a bearing element whose surface comes into contact with other surfaces by rolling or sliding. It further concerns the bearings thus obtained.

2. Discussion of the Background

U.S. Pat. No. 3,414,084 describes a well-known procedure for applying a self-lubricating coating based on PTFE in powder form, which is applied in particular to ball and roller bearings. This procedure involves blowing a PTFE-based powder into a bearing while rotating said bearing, so as to fill the interstices inside the bearing. This procedure is long and complex. Furthermore, it is difficult to achieve the fluid-tightness of the bearing. A higher degree of corrosion protection is obtained by increasing the quantity, and thus the thickness, of the PTFE coating on the internal surfaces of the bearing by increasing the roughness of these surface, either by mechanical or by chemical and electrochemical means. However, the increased thickness of the coating resulting from the abrasion of the surface eliminates the advantages of a thin coat application, which allows the bearing to function under high contact pressures without separation or tearing away of the PTFE layer from its base.

FR-A 2 082 623 describes a PTFE-coating procedure performed using electrophoresis on underlayers containing phosphates or on other underlayers formed using electrophoresis. The steps in the procedure, including cleaning, electrolytic scouring, coating by means of electrolysis, all of which are intrinsic to electrolytic procedures, increase the fragility of the treated components, and especially the steel subjected to rolling.

SUMMARY OF THE INVENTION

Accordingly it is an object of this invention to provide a procedure for the application of a PTFE-based, self-lubricating coating whose thickness is sufficiently thin to withstand high contact pressures occurring particularly when bearings must function under dry conditions without added lubrication and when they do not require any specific fluid-tight fitting.

More specifically, the invention provides a procedure for the application of a self-lubricating coating on a steel bearing element whose chrome and nickel contents are both less than 5 wt.%. The procedure is characterized by a working process in which the surface of the contacting parts of the element are treated by conversion, this treatment involving a microcrystalline phosphatization composed of an iron and manganese compound and carried out by applying the coating to the surface and between the crystals.

BRIEF DESCRIPTION OF THE FIGURES

Other characteristics of the invention will emerge from a reading of the following description provided with reference to the attached figures in which.

DETAILED DESCRIPTION OF THE PREFERRED EMBODIMENTS

Just prior to phosphatization, the rolling element, for example a ring, frame, or rolling body, undergoes a preparatory treatment, such as a passivating bath or extensive preliminary phosphatization. As a result, crystal nuclei appear and reach a stable form.

In this case, the difference between the chemical potential corresponding to this phase of the process and the calculated potential of the completed crystal remains approximately constant. The nuclei representing the very first crystal-formation elements occur in large numbers per surface unit, and produce a microcrystalline aggregate because of the reciprocal hindrance effect produced as they grow.

The very numerous crystals are basically composed of iron and manganese, and do not exceed 3 to 4 micrometers in size. The complete adherence of these crystals is basically attributable to their position on the base (growth by epitaxial nucleation).

The very special structure of the phosphatization layer thus formed and the density of the crystals obtained allow retention, without excess thickness, of the PTFE coating. Furthermore, as FIG. 2 illustrates, because of the morphology of the crystals, this layer may be crushed because of friction while remaining completely impregnated, thereby constituting a permanent reserve for the PTFE.

Figure 2:
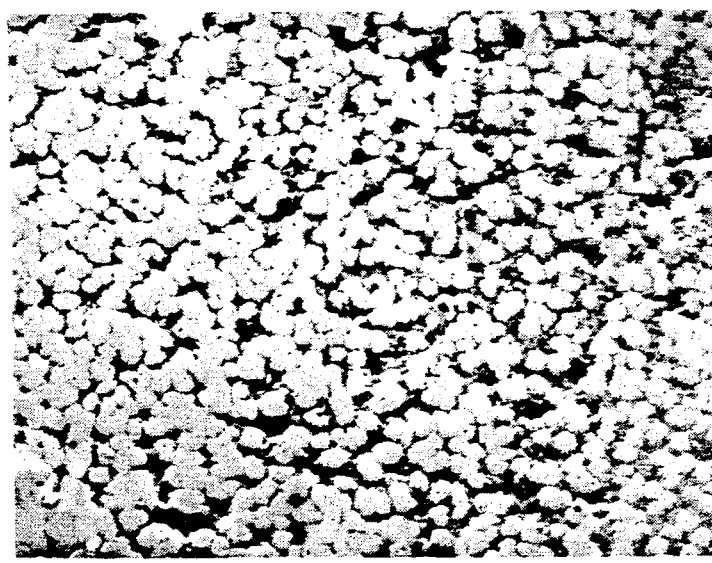
FIG. 2 is an enlarged view of a coated surface element, after friction and crushing of the crystals.

FIG. 2 illustrates the frictional crushing of the phosphate-treated layer and the formation of contacts which enhance PTFE impregnation of the bearing surface created by the contacts and of the surface between the crystals. PTFE is incorporated into the iron-manganese-induced phosphatization layer by spraying with a watery solution containing a PTFE powder whose particles measure approximately one micron in diameter. The final step of the process involves drying the entire unit at a temperature of approximately 220° C., to dehydrate the compound thus formed and to obtain the final desired state. The characteristics obtained from the use of this coating provide the essential properties underlying the principle of dry self-lubrification.

Figure 1:
FIG. 1 is an enlarged view of the coating on a surface element.
Figure 3:
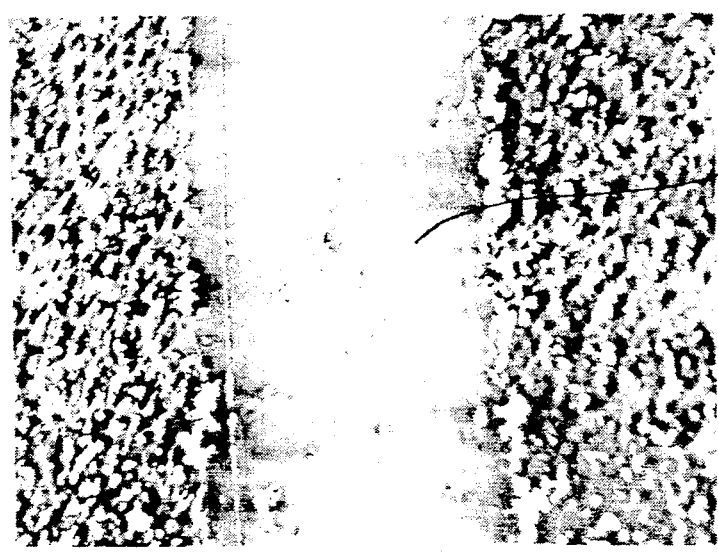
FIG. 3 is an enlarged view of a treated surface element whose central portion is subjected to friction stress.

The friction tests performed indicate that, in addition to the advantages conferred by improved PTFE lubrification (very low coefficient of friction), the self-lubricating coating makes possible long-term operation because of its slight thickness (3 to 4 microns), and because of the special behavior under stress of the self-lubricating layer, which is composed basically of PTFE encrusted between the crystals (3 to 4 microns). After undergoing friction, this layer becomes smooth, and remains filled with PTFE, as is demonstrated in FIGS. 2 and 3, from which one notes:

the surface condition of an area of steel of the "rolling-steel" type after impregnation with the self-lubricating coating (FIG. 1); and the surface condition of the same area after frictional wear of the functional area (A) (FIG. 3).

This procedure may be used for all kinds of bearing and maybe applied to all or a part of their components (rings, separation frames, rolling bodies).

Obviously, numerous modifications and variations of the present invention as possible in light of the above teachings. It is therefore to be understood that within the scope of the appended claims, the invention may be practiced otherwise than as specifically described herein.

What is claimed as new and desired to be secured by Letters Patent of the U.S. is:

1. A process for the application of a PTFE-based, self-lubricating coating on a steel bearing element whose nickel and chrome contents are less than 5%, comprising:
   (i) subjecting the element to a preparatory treatment in which crystal nuclei are formed;
   (ii) subjecting the element subsequently to a phosphatization treatment producing a microcrystalline layer composed of an iron and manganese compound; and
   (iii) coating the element with PTFE between said crystals.

2. The process of claim 1, wherein the initial preparatory treatment is carried out by subjecting said element to a passivating bath or prephosphatization thereby producing crystalline nuclei measuring between 3 and 4 micrometers.

3. The process of claim 1, wherein the PTFE is coated onto said element by means of a watery solution followed by drying.

4. A steel bearing element comprising a PTFE-based, self-lubricating coating, wherein said element has a nickel and chrome content of less than 5%, wherein said element is obtained by a process comprising:
   (i) subjecting said steel bearing element to a phosphatization treatment producing a microcrystalline layer composed of an iron and manganese compound; and
   (iii) coating the element with PTFE between said crystals.

5. The steel bearing element of claim 4, wherein the initial preparatory treatment is carried out by subjecting said element to a passivating bath or prephosphatization thereby producing crystalline nuclei measuring between 3 and 4 micrometers.

6. The steel bearing element of claim 4, wherein the PTFE is coated onto said element by means of a watery solution and is then dried.

7. The steel bearing element of claim 4, wherein said coating covers the frame, the inner ring, the outer ring, or the rolling bodies of said element.

8. The steel bearing element of claim 4, wherein said coating covers the frame, the inner rings, the outer ring, and the rolling bodies of said element.

* * * * *